Figure 1:
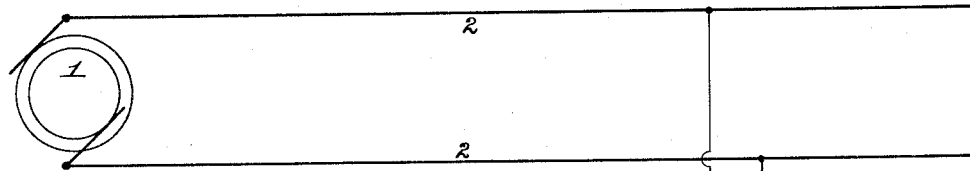

No. 875,178. PATENTED DEC. 31, 1907.
D. C. JACKSON.
ELECTRIC MOTOR.
APPLICATION FILED FEB. 20, 1901.

2 SHEETS—SHEET 1.

Witnesses:
Max W. Zabel
Milton M. Alexander.

Inventor
Dugald C. Jackson,
By Charles A. Brown & Cragg
Attorneys

No. 875,178. PATENTED DEC. 31, 1907.
D. C. JACKSON.
ELECTRIC MOTOR.
APPLICATION FILED FEB. 20, 1901.
2 SHEETS—SHEET 2.
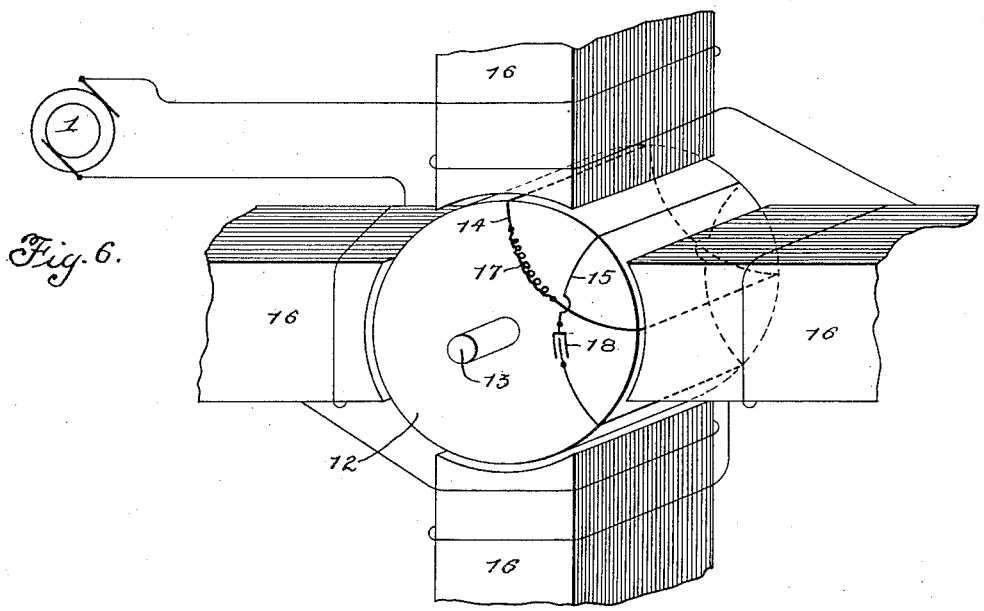
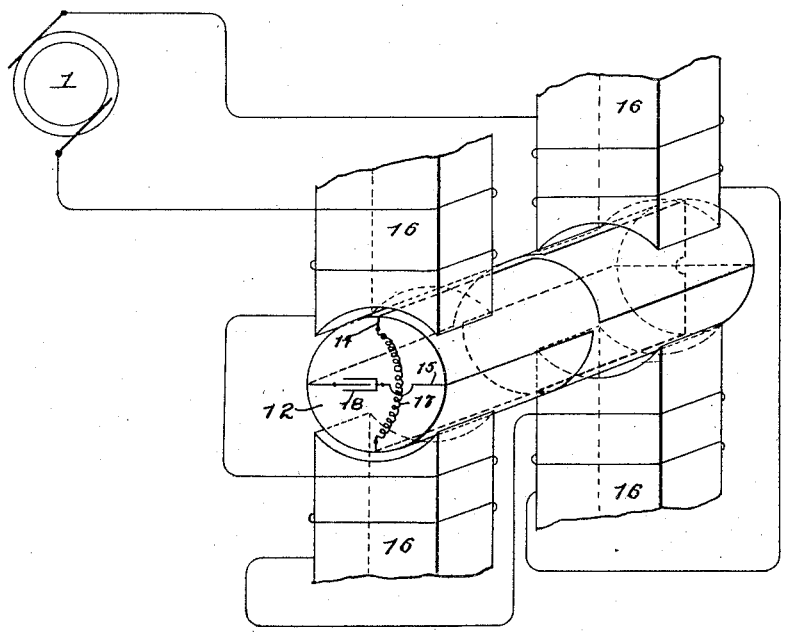
Witnesses:
Max W. Zabel.
Milton M. Alexander.
Inventor.
Dugald C. Jackson,
By Charles A. Brown & Cragg
Attorneys

UNITED STATES PATENT OFFICE.

DUGALD C. JACKSON, OF MADISON, WISCONSIN.

ELECTRIC MOTOR.

No. 875,178.  Specification of Letters Patent.  Patented Dec. 31, 1907.

Application filed February 20, 1901. Serial No. 48,056.

*To all whom it may concern:*

Be it known that I, DUGALD C. JACKSON, citizen of the United States, residing at Madison, in the county of Dane and State of Wisconsin, have invented a certain new and useful Improvement in Electric Motors, of which the following is a full, clear, concise, and exact description, reference being had to the accompanying drawings, forming a part of this specification.

My invention relates to alternating current motors, and more particularly to that class of motors known as induction motors, and has for its object the provision of an improved motor of this class which may operate in its preferred embodiment without difference of phase in the energizing circuits thereof.

In my application, Serial No. 53,835 filed April 1, 1901 I have described and claimed a method of operating motors constructed in accordance with the invention herein set forth.

It is the prime object of my invention to provide a motor which may be efficiently operated from single phase alternating current systems of distribution.

Single phase induction motors have heretofore been constructed and consist generally of a uniformly wound short circuited armature (such as is used for polyphase induction motors) and a single phase alternating field. These motors, however, are not self-starting, but when the armature thereof is started revolving in a single phase alternating field, the balance of repulsions which exists when the armature is at rest, is disturbed and the armature tends to continue its motion. Since these motors are not of themselves self-starting, special devices for accomplishing this result must be employed. The devices for this purpose are very inefficient and frequently consume a large amount of power, as is the case when phase splitting is resorted to. It will be seen, however, that this operation as applicable to such motors, cannot give a large difference of phase between currents in motor field circuits with a reasonably large power factor, and for this reason such motors have either a very small starting torque or an unreasonably small power factor at staring. Other devices of like nature which are employed, render single phase motors cumbersome and inefficient. Single phase motors of the prior art have also been constructed on the well known repulsion prinicple. Such motors may be self-starting, but are inefficient and bulky, as only a portion of the armature is continually effective.

By means of my invention I am enabled to construct a motor which is self-starting, without unreasonably decreasing the power factor, so that the motor exerts a considerable starting torque and which operates efficiently when running at its normal speed.

Generally speaking my invention consists in the provision of a motor in which simultaneously magnetizing or energizing currents induce in the armature conductors sets of currents that are of different phases or time positions, and thereby cause the rotation of the movable armature.

In the preferred embodiment of the invention I provide a plurality of distinct paths for the armature currents and so design these paths or circuits that they have different time constants. I may accomplish this result by arranging the circuits of varying resistance, self-inductance or capacity, so that the currents in the circuits are out of phase, although induced by a single phase alternating field.

Figure 2:
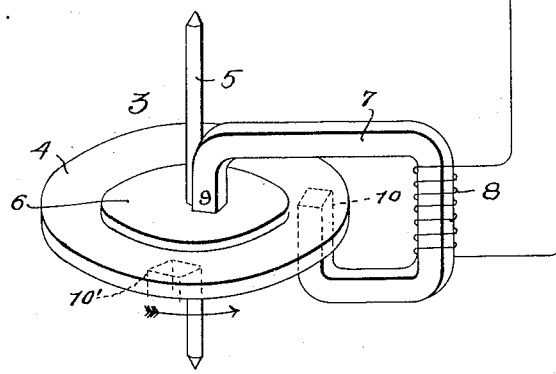
Figure 4:
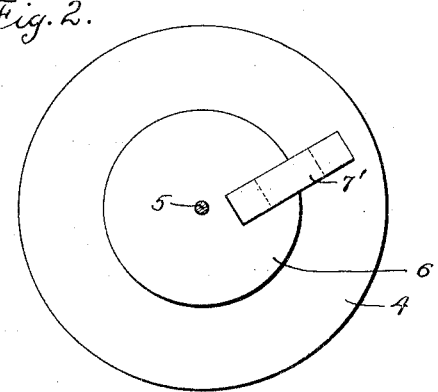
Figure 3:
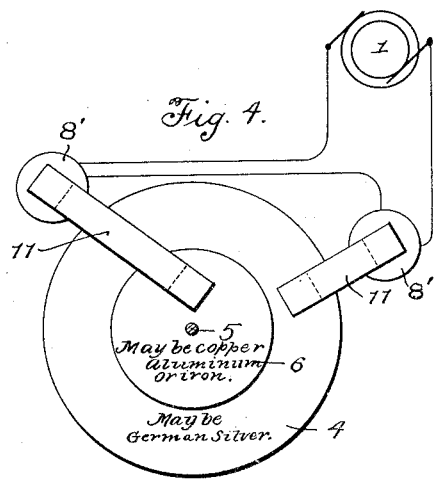
Figure 5:
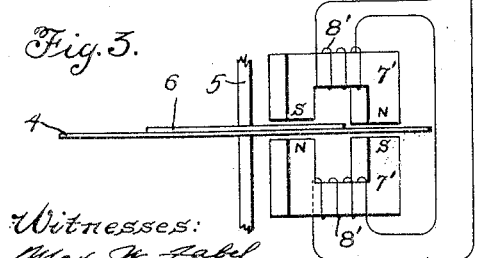

I will explain my invention more in detail by reference to the accompanying drawings illustrating the preferred embodiment thereof, in which, Figure 1 is a diagrammatic view of a motor constructed in accordance with my invention; Fig. 2 is a top view of a modification of the motor shown in Fig. 1; Fig. 3 is a side view of the motor shown in Fig. 2; Fig. 4 is a top view of another modification of my improved motor; Fig. 5 is a side view thereof; Fig. 6 is a broken view partly in diagram, of another form of motor constructed in accordance with my invention; Fig. 7 is a partial perspective of another embodiment of my invention.

Like characters of reference indicate like parts throughout the different figures.

Referring now more particularly to Fig. 1, I have shown a single phase alternating current generator 1, supplying current to the transmission circuit, comprising the mains 2, 2. My improved motive device 3, which receives current from said alternating current circuit, comprises an armature 4 mounted upon a spindle 5. The circular armature disk 4 is provided with a preferably thicker portion 6, or portion of less resistance, at the central portion thereof, so that the construction of the armature is practically equivalent to two superimposed disks of unlike diameter but preferably of equal thickness, the construction being such that separate paths of differing resistances for currents induced in the armature are offered through the two positions of the armature disk. The field - producing means for this device preferably consists of an electromagnet 7 which is energized by a coil 8 included in bridge of the supply mains 2, 2. One limb 9 of the electromagnet 7 is placed preferably in close proximity to the thicker portion 6 and near the central portion thereof. The remaining limb 10 of the electromagnet 7 is preferably considerably shorter so that its face is opposite the thinner portion of the armature 4, the said limb also being placed preferably to the right of the limb 9 so that the said limbs are not on a radial line passing through said armature.

When an alternating current passes through coil 8 the energization of the magnet 7 causes the armature 4 to revolve in the direction of the arrow as indicated. If the limb 10 be placed to the left of limb 9, as shown in dotted lines in the drawing, at 10', then the armature 4 will revolve in the opposite direction. Eddy currents are caused adjacent to each limb 9 and 10, the eddy current due to the limb 9 being constrained to flow within the thicker portion 6, and the eddy current due to the limb 10 flowing through the thinner portion of the disk of the armature 4, as is apparent from the drawings. The circuits of the eddy currents are thus of different resistance and self-inductance, as will be seen, and therefore have different time constants, whereby the said currents are out of phase and cause the rotation of the movable armature. Several such electromagnets set at intervals around the circumference of the armature may be used. The energizing windings of the several magnets may preferably all be then connected in series, and the limbs of the several magnets should all be placed in the proper positions to give rotation in the same direction.

A modification of the device shown in Fig. 1 is shown in Figs. 2 and 3. In this instance two electromagnets 7', 7', are employed, the coils 8', 8', thereof being shown in series relation. The north pole of one magnet is opposite the south pole of the second magnet, so that a complete magnetic circuit is obtained. Currents of different phase are created in the armature, as described in connection with Fig. 1.

A further modification is illustrated in Figs. 4 and 5, in which instance two electromagnets 11, 11, are employed, the two limbs of each of the electromagnets approaching the two faces of the disk inclosed thereby. The coils 8', 8', are again shown in series relation. The operation is similar to that previously described. The paths of different resistances and self-inductions, for the induced currents to flow in, may be produced by making the central circular portion 6 of the armature 4, of a different metal from the outer ring portion of the armature, as for instance the central portion may be of copper or aluminium and the outer portion of German silver, or the central portion may be iron and the outer portion of German silver. The central portion is still preferably thicker than the outer portion, but not necessarily so.

Referring now to Fig. 6, I have shown another manner of constructing a motor in accordance with my invention. In this case I employ a rotatably mounted drum or ring armature which is provided with suitable circuits of different time constants. I have here diagrammatically indicated two circuits and have shown each circuit as comprising one coil. It is well understood, however, that any suitable winding may be employed on the armature, the character of the winding simply being indicated in the drawing. The armature 12 is mounted upon suitable shafts 13 and carries two windings 14, 15. The windings 14 and 15 are preferably so constructed that they have different time constants so that under the influence of a single phase alternating field created by means of the salient poles 16, 16, currents of different phase will be conveyed through the said windings. The preferred manner of obtaining this result is shown in the drawing where I have included a self inductive coil 17 in series with winding 14, and a condenser 18 in series with winding 15. Under the same influences of inductive energization, the currents in the two windings will be out of phase. Current is supplied to the electromagnet 16 from the generator 1.

As will be understood, the rotation of the armature is caused by the out of phase currents in the armature winding reacting against the single phase alternating current in the same manner as a multiphase alternating field reacts against a single armature winding in the devices of the prior art. The motor of my invention is thus self-starting without decreasing materially the power factor of the circuit and is efficient in its operation at normal speed or load. It will of course be understood that the winding here described and also in connection with Fig. 7, although generally requiring the characteristics as set forth is not necessarily to be limited to one or two coils, but preferably consists of numerous conductors covering the armature core with a practically uniform conducting layer. This condition may of course be given by two uniformly wound progressive windings or two squirrel cages.

In Fig. 7 I have shown a modification of the motor illustrated in Fig. 6. In this instance the poles 16, 16, are disposed longitudinally of the armature and serve to react upon two armature windings 14 and 15 as before. Self-inductance 17 and capacity 18 are again included in the circuit. The scheme of winding which I prefer to employ in this connection, consists in passing an armature coil longitudinally upon both sides of the armature in a radial plane for about half the total length of the armature, then displacing the said coil about the armature through about ninety degrees, and then continuing said coil longitudinally of the armature for the remaining half thereof, as will be clear from the drawings. The effect in this instance of the longitudinally displaced poles 16, 16, is cumulative upon each coil of the armature. Instead of thus displacing the coils, one set of the poles may be angularly displaced an equal amount from their longitudinal position, and the armature coils may then be wound without displacing half their lengths.

I have shown the windings of the armatures in Figs. 6 and 7 with their coils electrically independent of each other, but this is not essential as the paths of the currents of different phases may interlink without departing from my invention.

While I have herein shown and particularly described some embodiments of my invention, I do not wish to limit myself to the precise constructions as herein shown and particularly described, as many modifications may be made by those skilled in the art without departing from the spirit of my said invention, but

Having thus described my invention, what I claim and desire to secure by Letters Patent is:—

1. In an induction motive device, the combination with means for creating a single phase alternating field, of an armature provided with electric circuits having different time constants subjected to said single phase alternating current field, the said field inducing out of phase currents in said armature circuits, substantially as described.

2. In an induction motive device, the combination with means for creating a single phase alternating field, of an armature subjected to the action of said single alternating field provided with a plurality of electric circuits, and phase modifying means associated with one of said circuits whereby out of phase currents are induced in said armature circuits, substantially as described.

3. In an induction motive device, the combination with means for creating a single phase alternating field, of an armature subjected to the action of said single phase alternating field provided with a plurality of electric circuits, and phase modifying means to enable the armature to start from a state of rest associated with said circuits for the purpose of creating out of phase currents in said armature, substantially as described.

4. In an induction motive device, the combination with means for creating a single phase alternating field, of an armature provided with electric circuits of unlike impedance subjected to said single phase alternating field, the said field inducing out of phase currents in said armature circuits, substantially as described.

5. In an induction motive device, the combination with means for creating a single phase alternating field, of an armature provided with electric circuits of unlike reactance subjected to said single phase alternating field, the said field inducing out of phase currents in said armature circuits, substantially as described.

6. In an induction motive device, the combination with means for creating a single phase alternating field, of an armature provided with electric circuits having unlike conductivities subjected to said single phase alternating current field for the purpose of inducing out of phase currents in said armature, substantially as described.

7. In an induction motive device, the combination with means for creating a single phase alternating field, of an armature provided with a plurality of electric circuits, inductive means associated with an armature circuit for causing the current through said circuit to lag, and a condenser associated with the remaining armature circuit for causing the current therethrough to lead, whereby the currents in said armature circuits will be out of phase, substantially as described.

8. In an induction motive device, the combination with means for creating a single phase alternating field, of an armature subjected to the action of said single phase alternating field, and means to enable the armature to start from a state of rest associated with said armature for bringing the currents induced therein out of phase, substantially as described.

9. In an induction motive device, the combination with field coils for creating a single phase alternating field, of an armature having a plurality of independent circuits subjected to said alternating field, and means inherent in the armature to enable the armature to start from a state of rest by causing out of phase currents to be induced in said circuits by said field, substantially as described.

10. In an induction motive device, the combination with field coils for creating a single phase alternating field of substantially uniform polar strength, of an armature inductively associated with said field and provided with a plurality of independent electric circuits of such character as to cause out of phase currents to be induced therein by said field to enable the armature to start from a state of rest, substantially as described.

11. In an induction motive device, the combination with field coils for creating a single phase alternating field, of an armature inductively associated with said field and provided with a plurality of independent electric circuits of such character as to cause out of phase currents to be induced therein by said field to enable the armature to start from a state of rest, substantially as described.

12. In an induction motive device, the combination with field coils for creating a single phase alternating field of substantially uniform polar strength, of an armature inductively associated with said field, a plurality of independent circuits upon said armature, and means included in each of said circuits for causing out of phase currents to be induced therein by said field whereby the armature may start from a state of rest, substantially as described.

13. In an induction motive device, the combination with coils for creating a single-phase alternating field, of an armature inductively associated with said field, said armature having different independent circuits adapted under the influence of said field to develop a plurality of out-of-phase fields, whereby said armature may be rotated, substantially as described.

14. In an induction motive device, the combination with coils for creating a single phase alternating field, of an armature inductively associated with said field, a plurality of independent windings for said armature, and means included in each of said windings whereby said armature, under the influence of said field, is adapted to develop a plurality of out of phase fields, whereby said armature may be rotated, substantially as described.

15. In an induction motive device, the combination with coils for creating a single phase alternating field, of an armature inductively associated with said field, a plurality of independent windings for said armature, a phase modifier associated with each of said circuits, whereby said armature is adapted, under the influence of said field, to develop a plurality of out of phase fields, to enable the armature to start from a state of rest, substantially as described.

16. An induction motive device having means for creating a single-phase alternating field, and an armature having different independent circuits in which are generated out-of-phase fields under the influence of said single-phase field, substantially as described.

17. In an induction motive device, the combination with field coils for creating a single phase alternating current field, of an armature subjected to the action of said single phase alternating field provided with a plurality of independent electric circuits, and phase modifiers included in said circuits to create out of phase currents in said armature, substantially as described.

18. In an induction motive device, the combination with coils for creating a single phase alternating field, of an armature having permanently closed independent conducting circuits under the influence of said single phase alternating current, and phase changing means included in said circuits whereby the armature may start from a state of rest under the influence of said single phase alternating current field, substantially as described.

19. In an induction motive device, the combination with field coils for creating a single phase alternating field, of an armature provided with electric circuits having unlike conductivities and subjected to said single phase alternating current field for the purpose of inducing out of phase currents in said armature, substantially as described.

20. An induction motive device, having field coils for creating a single-phase alternating field, and an armature having different independent circuits in which are generated out-of-phase fields under the influence of said single-phase field, substantially as described.

21. In an induction motive device, the combination with field coils for creating a single phase alternating field, of an armature provided with electric circuits having different time constants subjected to said single phase alternating field, the said field inducing out of phase currents in said armature circuits, substantially as described.

22. In an induction motive device, the combination with field coils for creating a single phase alternating field, of an armature provided with electric circuits of unlike impedance and subjected to said single phase alternating field, the said field inducing out of phase currents in said armature circuits, substantially as described.

23. In an induction motive device, the combination with coils for creating a single phase alternating field of substantially uniform polar strength, of an armature inductively associated with said field, a plurality of independent windings for said armature, and phase modifiers included in each of said windings for causing out of phase currents to be induced therein by said field, whereby the armature may start from a state of rest, substantially as described.

24. In an induction motive device, the combination with means for creating a single phase alternating field, of an armature inductively subjected to the action of said single phase alternating field, a plurality of independent windings for said armature, and phase modifying means included in each of said windings for the purpose of creating out of phase currents in said armature, whereby the said armature may start from a state of rest, substantially as described.

25. In an induction motive device, the combination with field coils for creating a single phase alternating field, of an armature inductively related with said field coils, different independent sections of the winding of said armature having different phase characteristics whereby the armature is adapted for generating out of phase fields, under the influence of said single phase fields, substantially as described.

26. In an induction motive device, the combination with field coils for creating a single phase alternating field, of an armature inductively associated with said field, different independent sections of the winding of said armature having different phase characteristics whereby said single phase alternating field may induce out of phase currents in said sections, substantially as described.

27. In an alternating current machine of the induction type, a secondary element having a plurality of windings, and one or more condensers and one or more impedances connected with different windings, as set forth.

28. In an alternating current machine of the induction type, a secondary element having a plurality of overlapping windings, and one or more condensers and one or more impedances connected with different windings, as set forth.

29. In an alternating current machine of the induction type, a secondary element having a plurality of windings, and a plurality of independent sets of condensers and impedances, connected with separate windings, as set forth.

30. In the alternating current machine of the induction type, a secondary element having a plurality of overlapping windings, and a plurality of independent sets of condensers and impedances, connected with different windings, as set forth.

In witness whereof, I hereunto subscribe my name this 13th day of December A. D., 1901.

DUGALD C. JACKSON.

Witnesses:
 MAX W. ZABEL,
 HARVEY L. HANSON.